United States Patent
Nagara et al.

(10) Patent No.: US 8,755,817 B2
(45) Date of Patent: Jun. 17, 2014

(54) WIRELESS COMMUNICATION DEVICE, PROGRAM, AND WIRELESS COMMUNICATION METHOD

(75) Inventors: Toru Nagara, Tokyo (JP); Tomoya Yamaura, Tokyo (JP)

(73) Assignee: Sony Corporation (JP)

( * ) Notice: Subject to any disclaimer, the term of this patent is extended or adjusted under 35 U.S.C. 154(b) by 90 days.

(21) Appl. No.: 13/116,220

(22) Filed: May 26, 2011

(65) Prior Publication Data

US 2011/0299461 A1  Dec. 8, 2011

(30) Foreign Application Priority Data

Jun. 2, 2010 (JP) ................. P2010-127080

(51) Int. Cl.
*H04W 64/00* (2009.01)
*H04W 4/02* (2009.01)

(52) U.S. Cl.
CPC ............... *H04W 64/00* (2013.01); *H04W 4/02* (2013.01)
USPC ................... 455/456.1; 455/414.2

(58) Field of Classification Search
CPC .............................. H04W 64/00; H04W 4/02
USPC ......................... 370/328; 455/456.1
See application file for complete search history.

(56) References Cited

U.S. PATENT DOCUMENTS

| | | | |
|---|---|---|---|
| 7,426,396 B2 | 9/2008 | Iwasaki et al. | |
| 2004/0081153 A1* | 4/2004 | Mayer et al. | 370/392 |
| 2004/0223477 A1* | 11/2004 | Iwasaki et al. | 370/338 |
| 2005/0259625 A1 | 11/2005 | Hosoda et al. | |
| 2009/0002237 A1 | 1/2009 | Nonoyama | |
| 2009/0067398 A1 | 3/2009 | Green et al. | |
| 2009/0070379 A1* | 3/2009 | Rappaport | 707/104.1 |
| 2009/0138336 A1* | 5/2009 | Ashley et al. | 705/10 |
| 2009/0219209 A1 | 9/2009 | Bush et al. | |

FOREIGN PATENT DOCUMENTS

| | | |
|---|---|---|
| DE | 10037474 A1 | 2/2002 |
| EP | 1950987 | 7/2008 |
| JP | 2004-274723 A | 9/2004 |
| JP | 3890290 B2 | 3/2007 |
| JP | 2009-141671 A | 6/2009 |
| WO | 0203093 | 1/2002 |

OTHER PUBLICATIONS

European Search Report EP 11161273, dated Aug. 19, 2011.

* cited by examiner

*Primary Examiner* — Jefferey Harold
*Assistant Examiner* — Justin Sanders
(74) *Attorney, Agent, or Firm* — Lerner, David, Littenberg, Krumholz & Mentlik, LLP

(57) ABSTRACT

There is provided a wireless communication device including a determination unit that determines a location region of the wireless communication device, a communication unit that wirelessly communicates with another wireless communication device, and a setting unit that sets a frequency in accordance with the location region of the wireless communication device determined by the determination unit to the communication unit. The determination unit determines a location region of the wireless communication device based on a plurality of pieces of location region information of the wireless communication device acquired by a plurality of different methods.

13 Claims, 13 Drawing Sheets

FIG. 2

| US NOTATION | U-NII LOWER | U-NII MIDDLE | | U-NII UPPER |
|---|---|---|---|---|
| JP NOTATION | W52 | W53 | W56 | |
| IEEE NOTATION | | | | |
| FREQUENCY | 5.15 – 5.25 | 5.25 – 5.35 | 5.470 – 5.725 | 5.725 – 5.825 / 5.85 |
| | 4.9 – 5.0 | | | |
| Channels | 5180(36) 5200(40) 5220(44) 5240(48) | 5260(52) 5280(56) 5300(60) 5320(64) | 5500(100) 5520(104) 5540(108) 5560(112) 5580(116) 5600(120) 5620(124) 5640(128) 5660(132) 5680(136) 5700(140) | 5745(149) 5765(153) 5785(157) 5805(161) 5825(165) |
| US | 40mW (ave) / 200mW (pk) | 200mW | 1W | 800mW |
| EU | | 200mW | | |
| JP | | | | |

| Country | W52 (5.15–5.25) | W53 (5.25–5.35) | W56 (5.470–5.725) | U-NII UPPER (5.725–5.85) |
|---|---|---|---|---|
| JAPAN | INDOORS | INDOORS & OUTDOORS | INDOORS & OUTDOORS | |
| U.S. | INDOORS | INDOORS & OUTDOORS | | INDOORS & OUTDOORS |
| CANADA | INDOORS | INDOORS & OUTDOORS | | INDOORS & OUTDOORS |
| ARGENTINA | | | | |
| BRAZIL | | | | |
| COLUMBIA | INDOORS | INDOORS & OUTDOORS | | INDOORS & OUTDOORS |
| MEXICO | INDOORS | INDOORS | | INDOORS & OUTDOORS |
| U.K. | INDOORS | INDOORS | INDOORS & OUTDOORS | |
| FRANCE | INDOORS | INDOORS | INDOORS & OUTDOORS | |
| GERMANY | INDOORS | INDOORS | INDOORS & OUTDOORS | |
| DENMARK | INDOORS | INDOORS | INDOORS & OUTDOORS | |
| FINLAND | INDOORS | INDOORS | INDOORS & OUTDOORS | |
| IRELAND | INDOORS | INDOORS | INDOORS & OUTDOORS | |
| ITALY | INDOORS | INDOORS | INDOORS & OUTDOORS | |
| NETHERLANDS | INDOORS | INDOORS | INDOORS & OUTDOORS | |
| NORWAY | INDOORS | INDOORS | INDOORS & OUTDOORS | |
| PORTUGAL | INDOORS | INDOORS | INDOORS & OUTDOORS | |
| SWEDEN | INDOORS | INDOORS | INDOORS & OUTDOORS | |
| AUSTRIA | INDOORS | INDOORS | INDOORS & OUTDOORS | |
| BELGIUM | INDOORS | INDOORS | INDOORS & OUTDOORS | |
| SWISS | INDOORS | INDOORS | INDOORS & OUTDOORS | |
| AUSTRALIA | INDOORS | INDOORS | | INDOORS & OUTDOORS |
| CHINA | | | | |
| HONG KONG | INDOORS | INDOORS | | INDOORS & OUTDOORS |
| SOUTH KOREA | INDOORS & OUTDOORS | | | INDOORS & OUTDOORS (PERSONAL USE IS UNAVAILABLE?) |
| NEW ZEALAND | INDOORS & OUTDOORS | INDOORS | | INDOORS & OUTDOORS |
| SINGAPORE | | INDOORS | | INDOORS & OUTDOORS |
| TAIWAN | | | | INDOORS & OUTDOORS |

DFS IS NECESSARY ←→

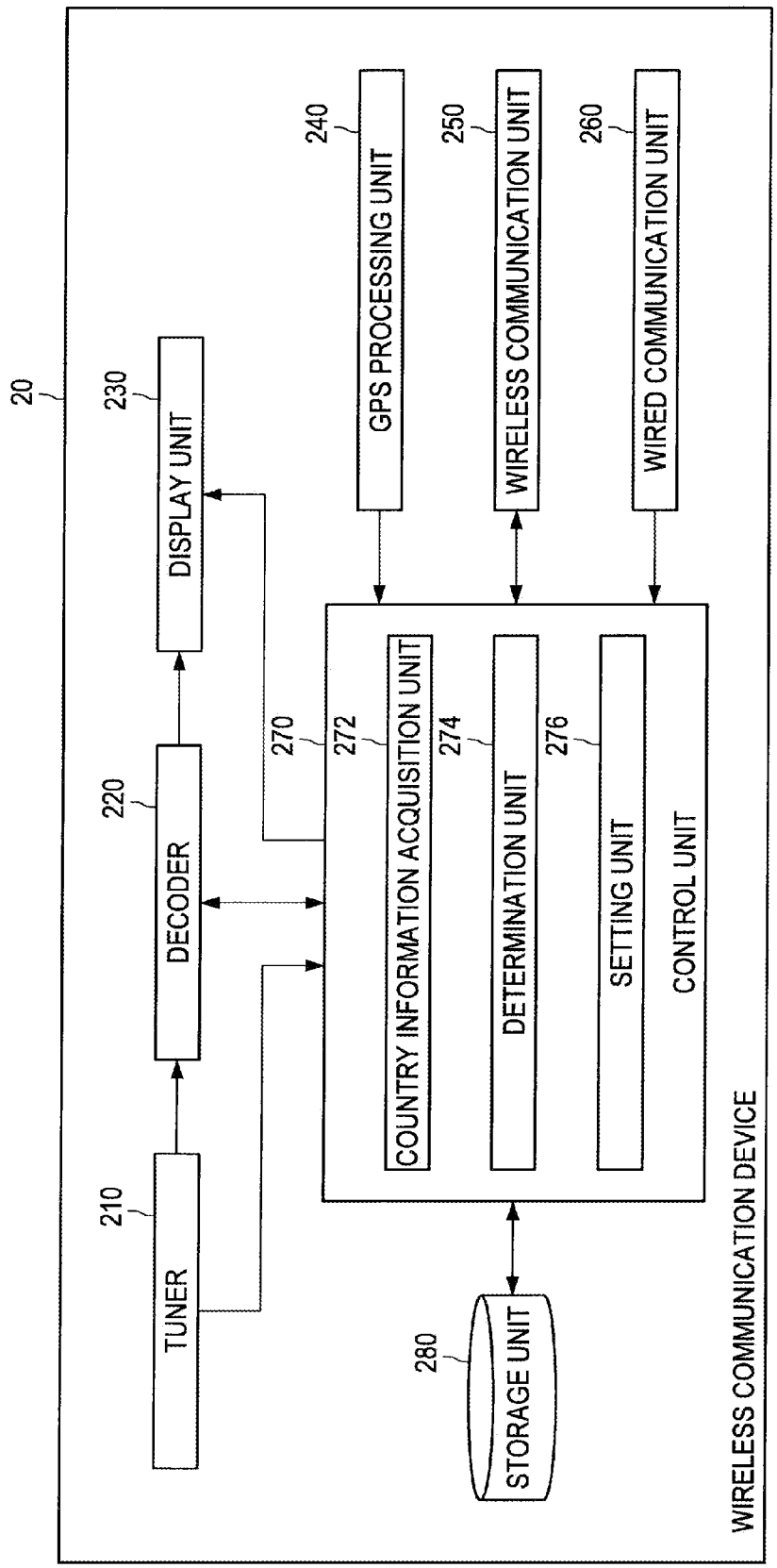

FIG.4

| COUNTRY | OUTPUT mW | 5180 | 5200 | 5220 | 5240 | 5260 | 5280 | 5300 | 5320 | 5500 | 5520 | 5540 | 5560 | 5580 | 5600 | 5620 | 5640 | 5660 | 5680 | 5700 | 5720 | 5740 | 5760 | 5780 | 5800 | 5825 |
|---|---|---|---|---|---|---|---|---|---|---|---|---|---|---|---|---|---|---|---|---|---|---|---|---|---|---|
| US | 40 | O | O | O | O | O | O | O | O | | | | | | | | | | | | | O | O | O | O | O |
| JP | 40 | O | O | O | O | O | O | O | O | O | O | O | O | O | O | O | O | O | O | O | O | | | | | |
| Swiss | 60 | O | O | O | O | | | | | | | | | | | | | | | | | | | | | |
| Brazil | 40 | | | | | | | | | | | | | | | | | | | | | | | | | |

FIG.8

| NETWORK | TYPE | Network id | COUNTRY 1 | COUNTRY 2 | COUNTRY 3 | COUNTRY 4 |
|---|---|---|---|---|---|---|
| NETWORK | SATELLITE | 2 | GBR | FRA | DEU | ESP |
| NETWORK | CABLE | 5 | DEU | | | |
| NETWORK | TERRESTRIAL WAVE | 11 | ESP | | | |

WIRELESS COMMUNICATION DEVICE, PROGRAM, AND WIRELESS COMMUNICATION METHOD

CROSS-REFERENCE TO RELATED APPLICATION

The present application claims priority from Japanese Patent Application No. JP 2010-127080 filed in the Japanese Patent Office on Jun. 2, 2010, the entire content of which is incorporated herein by reference.

BACKGROUND OF THE INVENTION

1. Field of the Invention

The present disclosure relates to a wireless communication device, a program, and a wireless communication method.

2. Description of the Related Art

The wireless LAN standard IEEE802.11 is widespread all over the world today. A frequency band used by IEEE802.11 is broadly divided into the 2.4 GHz band and the 5 GHz band. The 2.4 GHz band can be used universally, whereas the availability of the 5 GHz band differs depending on country and region.

Thus, various suggestions have been made for the use of a frequency in compliance with the laws and regulations. For example, Japanese Unexamined Patent Publication No. 2009-141671 discloses a technique that, on the assumption that an access point is using a frequency allowed in an installation location, a wireless communication device (CE device) such as a television (TV) or a mobile phone performs a passive scan and uses only a frequency band in which the access point is emitting a radio wave.

On the other hand, the communication standard called WiFi Direct has been proposed which allows several wireless communication devices to communicate directly with each other, which is different from a traditional communication scheme in which an access point and a wireless communication device communicate. In WiFi Direct, communication is initiated when one of two wireless communication devices to establish a connection emits a radio wave to the other device, and therefore it is necessary for wireless communication devices to have another means of acquiring country information which is not dependent on a passive scan by an access point.

Regarding this point, Japanese Unexamined Patent Publication No. 2004-274723 and Japanese Patent No. 3890290, for example, describe that a wireless communication device identifies a country based on GPS or the like and sets a frequency allowed in the identified country.

SUMMARY OF THE INVENTION

However, the country information acquired by one method is not necessarily correct. Further, it may be difficult to identify a country based on GPS indoors or underground. Therefore, there is a concern that a wireless communication device acquires incorrect country information and emits a frequency which is not permitted in the location.

In light of the foregoing, it is desirable to provide novel and improved wireless communication device, program, and wireless communication method capable of improving the accuracy of determining a location region.

According to the present disclosure, there is provided a wireless communication device including, a determination unit that determines a location region of the wireless communication device, a communication unit that wirelessly communicates with another wireless communication device, and a setting unit that sets a frequency in accordance with the location region of the wireless communication device determined by the determination unit to the communication unit. The determination unit determines a location region of the wireless communication device based on a plurality of pieces of location region information of the wireless communication device acquired by a plurality of different methods.

A priority may be assigned to location region information acquired by each of the plurality of methods, and when the location region information acquired by each of the plurality of methods is different, the determination unit may determine a location region of the wireless communication device according to the location region information acquired by a method with a highest priority.

The plurality of methods may include a first method using GPS, a second method that makes access to a network and acquires the location region information from a global address allocated to a router, and a third method that acquires the location region information from broadcast station information contained in a received broadcast wave.

A priority of the second method may be lower than a priority of the first method, and a priority of the third method may be lower than the priority of the second method.

The plurality of methods may include a method that acquires the location region information registered in advance in a storage medium, and when the location region information acquired by the method and the location region information acquired by another method match, the determination unit may determine a location region of the wireless communication device according to the matching location region information.

When the location region information acquired by the method and the location region information acquired by the another method do not match, the setting unit may set a frequency available in all regions to the communication unit.

The another method may be one of a method using GPS, a method that makes access to a network and acquires the location region information from a global address allocated to a router, and a method that acquires the location region information from broadcast station information contained in a received broadcast wave.

When the location region information acquired by each of the plurality of methods is different, the determination unit may determine a location region of the wireless communication device according to the location region information acquired by a largest number of methods.

According to another embodiment of the present disclosure, there is provided a program causing a computer to function as a wireless communication device, the wireless communication device comprising, a determination unit that determines a location region of the wireless communication device, a communication unit that wirelessly communicates with another wireless communication device, and a setting unit that sets a frequency in accordance with the location region of the wireless communication device determined by the determination unit to the communication unit. The determination unit determines a location region of the wireless communication device based on a plurality of pieces of location region information of the wireless communication device acquired by a plurality of different methods.

According to another embodiment of the present disclosure, there is provided a wireless communication method including steps of determining a location region of a wireless communication device, and wirelessly communicating with another wireless communication device by use of a frequency in accordance with the determined location region of the wireless communication device. The determination of a location region is made based on a plurality of pieces of location region information of the wireless communication device acquired by a plurality of different methods.

According to the embodiments of the present disclosure described above, it is possible to improve the accuracy of determining a location region of a wireless communication device.

BRIEF DESCRIPTION OF THE DRAWINGS

FIG. 2 is an explanatory view showing frequencies allowed for each country;

FIG. 3 is a functional block diagram showing a configuration of a wireless communication device according to an embodiment of the present disclosure;

FIG. 4 is an explanatory view showing a specific example of country information database;

FIG. 8 is an explanatory view showing a specific example of broadcast station information database;

DETAILED DESCRIPTION OF THE EMBODIMENT(S)

Figure 1:
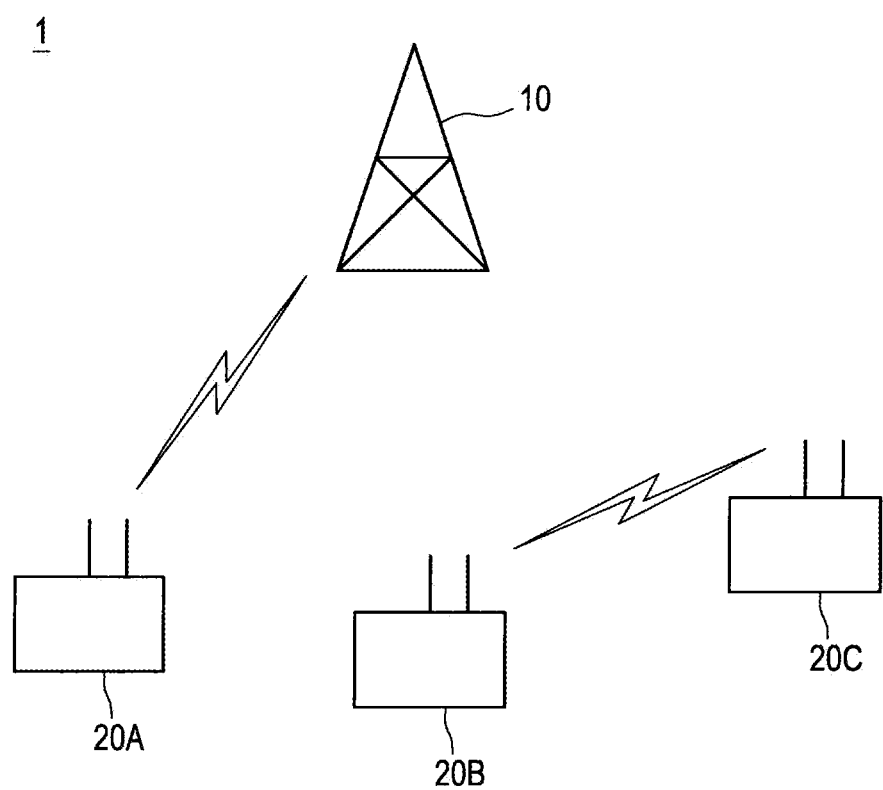
FIG. 1 is an explanatory view showing a configuration of a wireless communication system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. For example, a plurality of structural elements having substantially the same function are distinguished like wireless communication devices 20A, 20B and 20C where necessary. However, when there is no particular need to distinguish between a plurality of structural elements having substantially the same function, they are denoted only by the same reference numeral. For example, when there is no particular need to distinguish between the wireless communication devices 20A, 20B and 20C, they are referred to simply as the wireless communication device 20.

Preferred embodiments of the present disclosure will be described hereinafter in the following order.

1. Configuration of Wireless Communication System
2. Configuration and Operation of Wireless Communication Device
   2-1. Country Information Acquisition Method
      (Acquisition Method Using Broadcast Wave)
      (Acquisition Method Using GPS)
      (Acquisition Method Using Information of Base Station for Mobile)
      (Acquisition Method Using IP Address)
      (Acquisition Method Using Information of Base Station for Wireless LAN)
      (Acquisition Method Based On Initial Settings)
   2-2. Country Determination Method
      (First Example)
      (Second Example)
      (Third Example)
      (Fourth Example)
3. Summary <1. Configuration of Wireless Communication System>

A configuration of a wireless communication system 1 according to an embodiment of the present disclosure is described hereinafter with reference to FIG. 1.

FIG. 1 is an explanatory view showing a configuration of the wireless communication system 1 according to an embodiment of the present disclosure. Referring to FIG. 1, the wireless communication system 1 according to the embodiment of the present disclosure includes a base station and a plurality of wireless communication devices 20A to 20C.

The base station 10 is an access point of wireless LAN and can accommodate the wireless communication device 20. The base station 10 conforms to IEEE802.11, which is widespread all over the world, for example. A frequency band used by IEEE802.11 is broadly divided into the 2.4 GHz band and the 5 GHz band.

Although the 2.4 GHz band can be used universally, the availability of the 5 GHz band differs depending on country and region as shown in FIG. 2. Therefore, the base station 10 is set to use a frequency in accordance with a country where the base station 10 is installed. For example, the base station 10 which is installed in Japan can be set to use a frequency of 5500 GHz to 5700 GHz, the base station 10 which is installed in the United States is set not to use a frequency of 5500 GHz to 5700 GHz.

The wireless communication device 20 establishes a wireless LAN with the base station 10 and communicates with the base station 10 according to control by the base station 10. It is necessary for the wireless communication device 20 to use a frequency in accordance with a location region. Thus, the wireless communication device 20A that communicates with the base station 10 may, for example, perform a passive scan and use a frequency band in which the base station 10 is emitting a radio wave based on the assumption that the base station 10 is properly using a frequency allowed in a country where it is installed.

Note that the wireless communication device 20 may be an information processing device such as a PC (Personal Computer), a home video processing device (e.g. a television device, a tuner, a DVD recorder, a videocassette recorder etc.), a home game device, or an electrical household appliance. Further, the wireless communication device 20 may be an information processing device such as a mobile phone, a PHS (Personal Handyphone System), a portable imaging device, a portable music playback device, a portable video processing device, or a portable game device.

On the other hand, the wireless communication devices 20 may directly connect to each other according to the communication standard called WiFi Direct, such as the wireless communication device 20B and the wireless communication device 20C shown in FIG. 1. In WiFi Direct, communication is initiated when one of two wireless communication devices 20 to establish a connection emits a radio wave to the other, and therefore it is necessary for the wireless communication devices 20 to have another means of acquiring country information (location region information) which is not dependent on a passive scan by the base station 10.

Given such circumstances, an embodiment of the present disclosure has been invented. The wireless communication device 20 according to the embodiment of the present disclosure is capable of determining a location region with high accuracy without depending on a passive scan by the base station 10. Hereinafter, the wireless communication device 20 according to the embodiment of the present disclosure is described in detail.

<2. Configuration and Operation of Wireless Communication Device>

FIG. 3 is a functional block diagram showing a configuration of the wireless communication device 20 according to an embodiment of the present disclosure. Referring to FIG. 3, the wireless communication device 20 includes a tuner 210, a decoder 220, a display unit 230, a GPS processing unit 240, a wireless communication unit 250, a wired communication unit 260, a control unit 270, and a storage unit 280.

The tuner 210 extracts a desired stream from a television broadcast wave and supplies the extracted stream to the decoder 220. Note that the television broadcast may be of various kinds such as BS (Broadcast Satellite) broadcast, CS (Communications Satellite) broadcast, digital terrestrial broadcast, analog terrestrial broadcast, and cable broadcast.

The decoder 220 decodes the stream supplied from the tuner 210 and thereby acquires a video signal. The display unit 230 displays the video signal acquired by the decoder 220. The display unit 230 may be a CRT (Cathode Ray Tube) display device, an LCD (Liquid Crystal Display) device, or an OLED (Organic Light Emitting Display) device, for example.

The GPS processing unit 240 receives a navigation message from a satellite and estimates current position information (latitude and longitude information) based on ephemeris information contained in the navigation message.

The wireless communication unit 250 performs processing to communicate with the base station 10 or another wireless communication device 20. Specifically, the wireless communication unit 250 performs radio signal processing and antenna signal processing such as modulation and demodulation, mapping and demapping, and interleaving. Further, the wireless communication unit 250 performs wireless communication using a frequency which is set by a setting unit 276 of the control unit 270. Furthermore, the wireless communication unit 250 may have a function to communicate with a base station of a mobile phone.

The wired communication unit 260 is a component for wired communication with another device, and the wireless communication device 20 may connect to a network through the wired communication unit 260.

The control unit 270 includes a country information acquisition unit 272, a determination unit 274, and the setting unit 276, and controls the overall operation of the wireless communication device 20.

The country information acquisition unit 272 acquires country information indicating a country where the wireless communication device 20 is located by a plurality of methods. The country information acquisition unit 272 acquires country information by each of an acquisition method using a broadcast wave, an acquisition method using GPS, an acquisition method using an IP address, and an acquisition method using information of a base station for mobile, as is described in detail later in "2-1. Country Information Acquisition Method".

The determination unit 274 determines a country where the wireless communication device 20 is located based on the country information acquired by each of the plurality of methods by the country information acquisition unit 272. When the country information acquired by each of the plurality of methods is different from each other, the determination unit 274 may appropriately determine a country where the wireless communication device 20 is located according to predetermined criteria. A determination method by the determination unit 274 is described in detail later in "2-2. Country Determination Method".

The setting unit 276 sets the use of a frequency allowed in the country where the wireless communication device is located which is determined by the determination unit 274 to the wireless communication unit 250. The setting unit 276 may acquire the frequency allowed in the country where the wireless communication device 20 is located based on country information database that is stored in the storage unit 280.

The storage unit 280 is a storage medium that stores various kinds of information necessary for the operation of the wireless communication device 20. For example, the storage unit 280 stores country information database, broadcast station information database or the like. A specific example of the country information database is described hereinafter with reference to FIG. 4.

FIG. 4 is an explanatory view showing a specific example of country information database. As shown in FIG. 4, the country information database contains frequency information allowed in each country. Based on the country information database, the setting unit 276 can grasp that the use of a frequency of 5180~5700 GHz is allowed in Japan, for example.

It should be noted that the storage unit 280 may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc®) and so on.

[2-1. Country Information Acquisition Method]

A plurality of methods for the country information acquisition unit 272 to acquire country information are described hereinbelow. Note that the country information acquisition unit 272 does not necessarily use all of the methods described below. Further, the followings are just a few examples of the country information acquisition methods, and the country information acquisition unit 272 may acquire country information by using other methods.

(Acquisition Method Using Broadcast Wave)

First, a method of acquiring country information using information contained in a received broadcast wave is described with reference to FIGS. 5 to 8.

Figure 5:
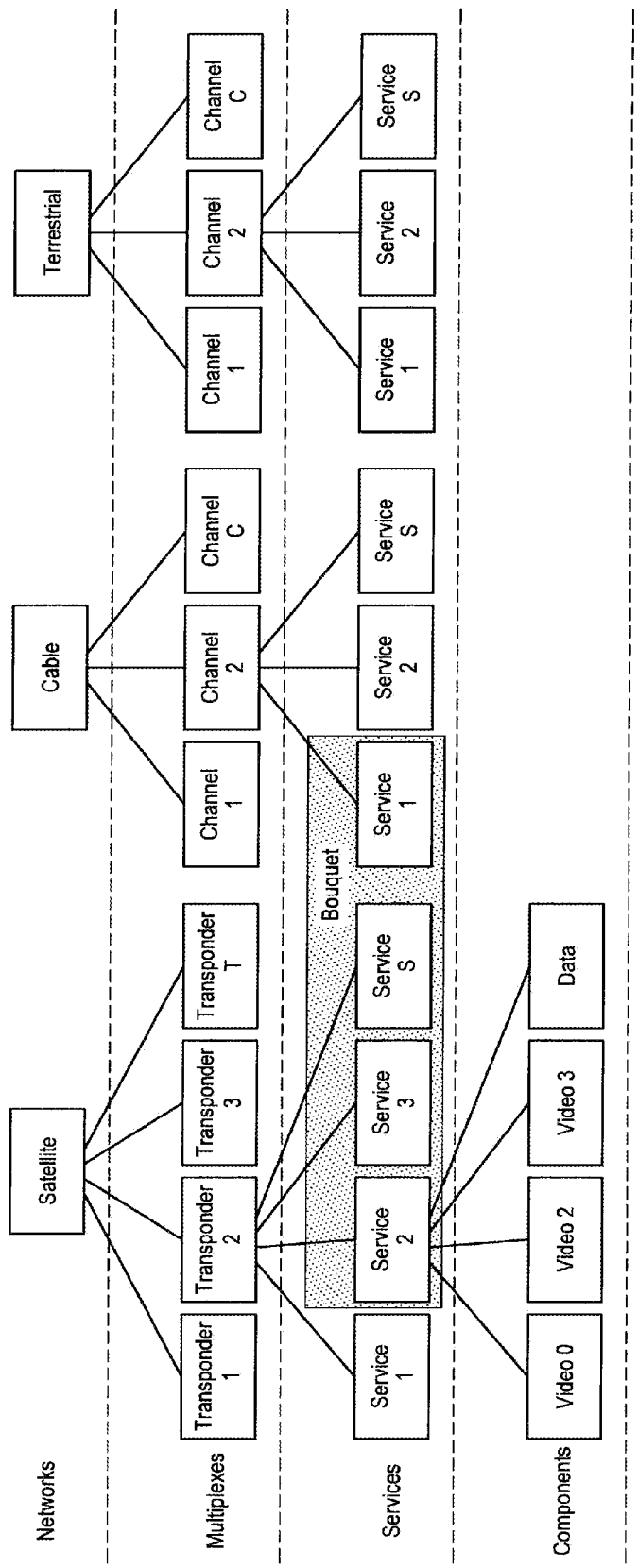
FIG. 5 is an explanatory view showing a broadcast wave distribution model.
Figure 6:
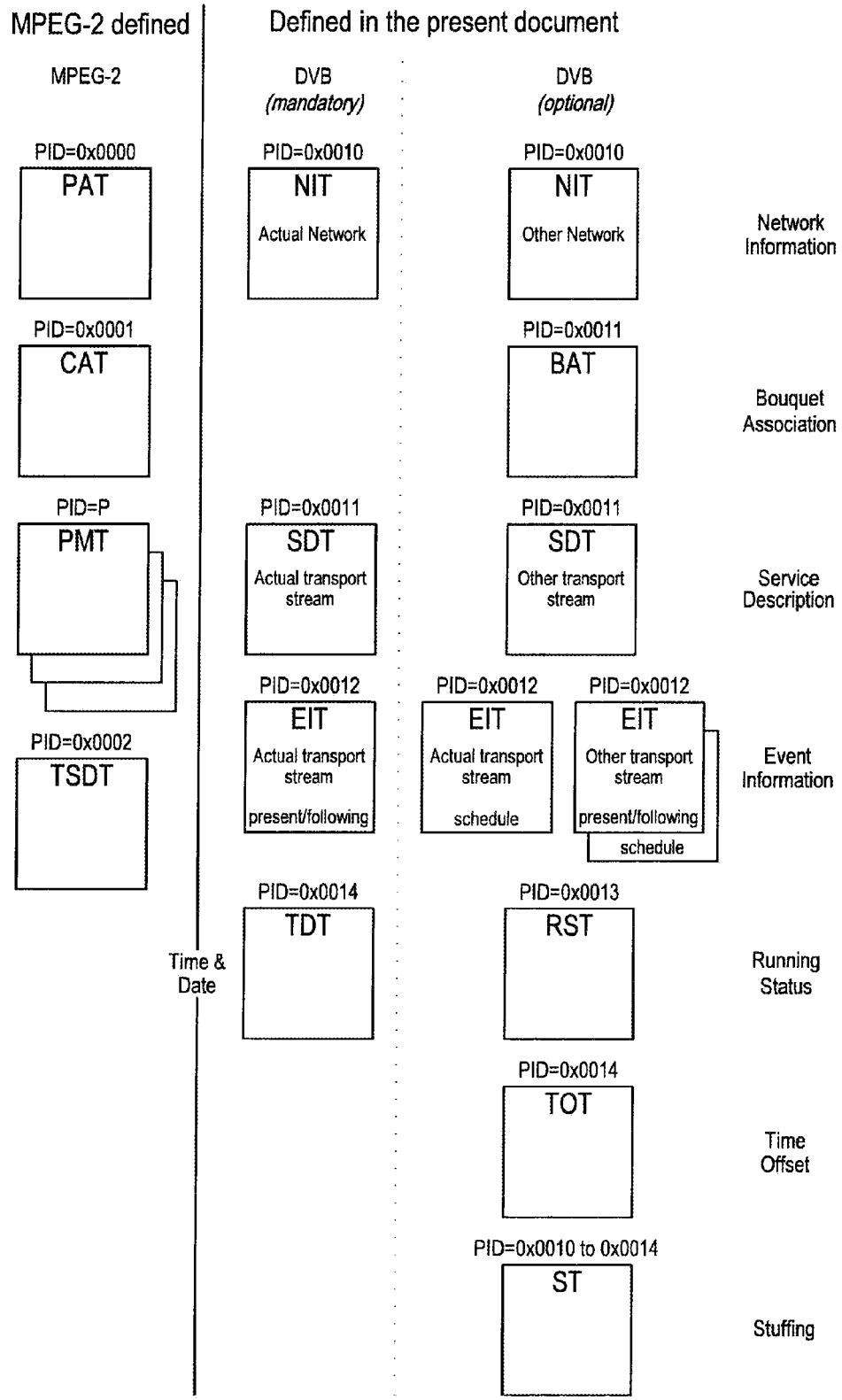
FIG. 6 is an explanatory view showing a structure of service information contained in a broadcast wave.

FIG. 5 is an explanatory view showing a broadcast wave distribution model. FIG. 6 is an explanatory view showing a structure of service information (SI) contained in a broadcast wave. A broadcast wave contains PSI (Program Specific Information) or EPG (Electric Program Guide), for example, as service information, in addition to MPEG-TS.

Further, the service information includes NIT (Network Information Table) ☐BAT (Bouquet Association Table), and SDT (Service Description Table) as shown in FIG. 6.

A network such as satellite broadcast ("Satellite") or cable broadcast ("Cable") shown in FIG. 5 which is described in NIT has a plurality of channels, and each channel provides a plurality of services. For example, in digital terrestrial broadcasting in Japan, normal broadcasting and 1-SEG broadcasting are implemented by use of 13 segments included in 1 channel. A plurality of services may be described collectively in BAT. Further, information of each service (each content) is described in SDT.

Specifically, BAT and SDT contain a country availability descriptor which indicates countries where broadcasting is allowed and countries where broadcasting is not allowed. Note that, however, because a services is assumed to be transferred to various networks, it is expected that the countries where broadcasting is allowed which are indicated by the country availability descriptor include more countries than countries where a broadcast wave can be received.

Further, an extended descriptor of NIT, BAT or SDT contains target region information. When target region information is contained in NIT, the target region information indicates a target country or region of the entire network. On the other hand, when target region information is contained in BAT or SDT, the target region information indicates a country or region as a target of each bouquet or service.

Thus, the country information acquisition unit 272 may acquire country information where the wireless communication device 20 is located from the target region information of NIT. Note that the target region information is described by a country code of three alphabetic characters in accordance with ISO 3166. For example, "GBR" corresponds to "United Kingdom", "DEU" corresponds to "Germany", and "ESP" corresponds to "Spain". A country information acquisition method using a broadcast wave is described hereinafter according to a flowchart.

Figure 7:
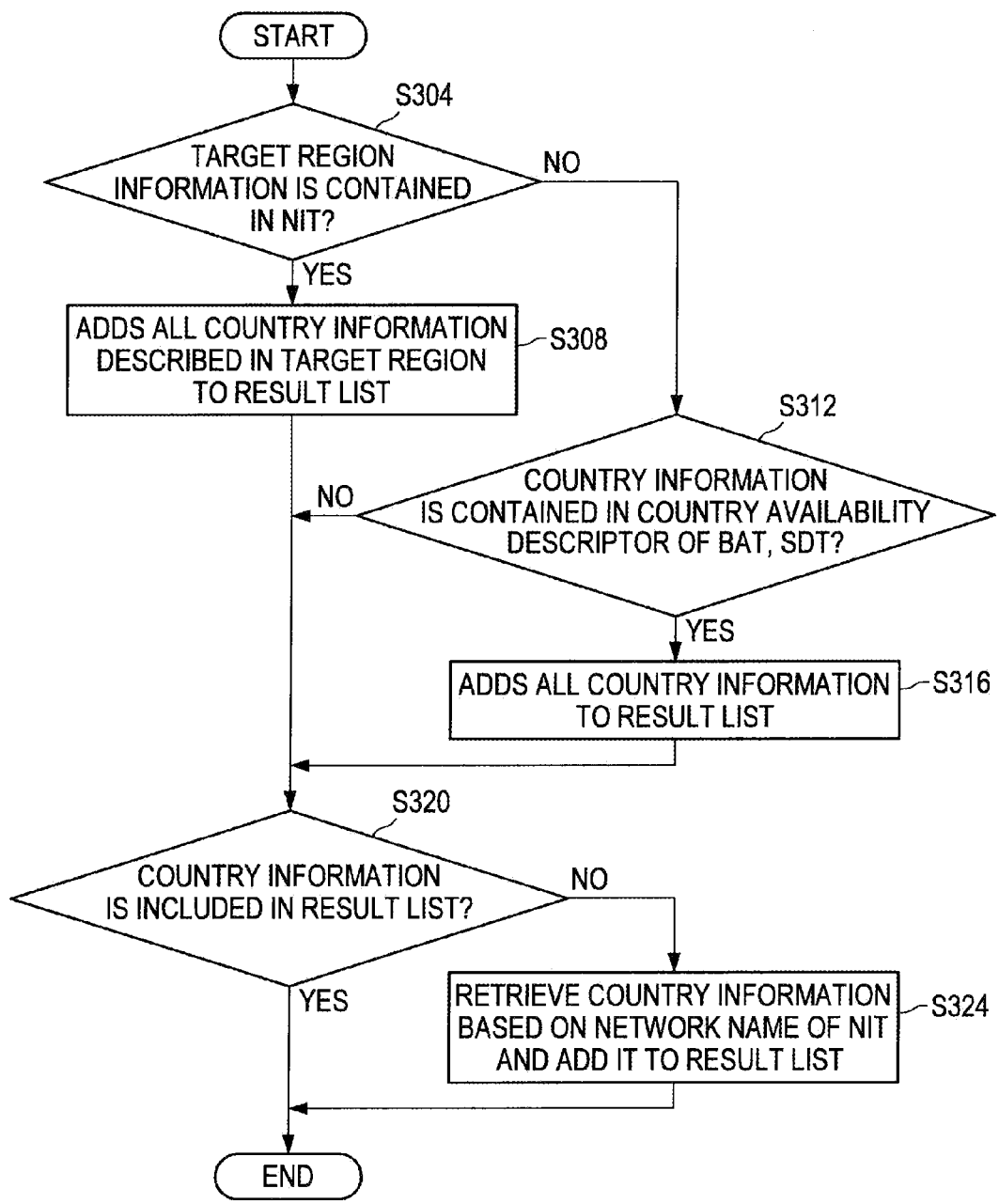
FIG. 7 is a flowchart showing a country information acquisition method using a broadcast wave.

FIG. 7 is a flowchart showing a country information acquisition method using a broadcast wave. Referring to FIG. 7, the country information acquisition unit 272 first determines whether target region information is contained in NIT (S304). When target region information is contained in NIT, the country information acquisition unit 272 adds all the country information described in the target region information to a result list by the acquisition method (S308).

On the other hand, when target region information is not contained in NIT, the country information acquisition unit 272 determines whether country information is contained in a country availability descriptor of BAT or SDT (S312). When country information is contained in BAT or SDT, the country information acquisition unit 272 adds all the country information to the result list (S316).

Then, when country information is included in the result list, the country information acquisition unit 272 ends the acquisition of country information using a broadcast wave (S320). On the other hand, when country information is not included in the result list, the country information acquisition unit 272 retrieves country information based on a network name of NIT by use of the Internet and adds the retrieved country information to the result list (S324).

Note that, when broadcast station information database shown in FIG. 8 is stored in the storage unit 280, the country information acquisition unit 272 may retrieve country information from the broadcast station information database.

FIG. 8 is an explanatory view showing a specific example of broadcast station information database. As shown in FIG. 8, the broadcast station information database contains country information associated with a broadcast station (network). Thus, when the network name of NIT is "Network Y", the country information acquisition unit 272 may retrieve country information "DEU" associated with "Network Y" in the broadcast station information database and add the country information "DEU" to the result list.

(Acquisition Method Using GPS)

The country information acquisition unit 272 may acquire country information based on position information of the wireless communication device 20 which is estimated by the GPS processing unit 240. For example, when range information of each country is stored in the storage unit 280, the country information acquisition unit 272 may refer to the range information of each country and acquire country information indicating a country including the position information estimated by the GPS processing unit 240.

Alternatively, the country information acquisition unit 272 may transmit the position information estimated by the GPS processing unit 240 to a Web server that converts position information into country information and thereby acquire country information from the Web server.

(Acquisition Method Using Information of Base Station for Mobile)

When the wireless communication device 20 has a mobile phone function, the country information acquisition unit 272 may acquire country information or region information from a detected base station for a mobile phone. For example, the country information acquisition unit 272 may acquire country information or region information based on received information from the base station for a mobile phone.

(Acquisition Method Using IP Address)

Further, the country information acquisition unit 272 may acquire country information based on an IP address of a router in the vicinity. A method of acquiring country information using an IP address of a router is described hereinafter according to a flowchart.

Figure 9:
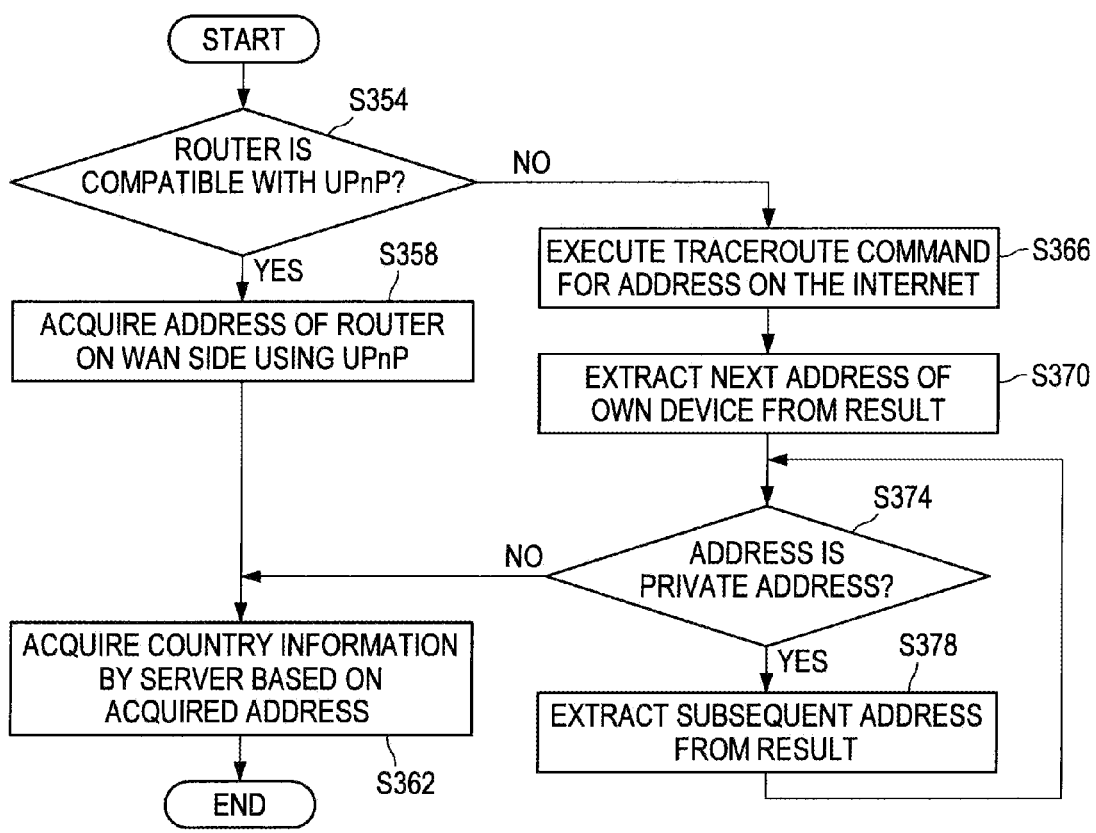
FIG. 9 is a flowchart showing a country information acquisition method using an IP address of a router.

FIG. 9 is a flowchart showing a country information acquisition method using an IP address of a router. Referring to FIG. 9, when the wireless communication device 20 makes access to a network, the country information acquisition unit 272 determines whether a router is compatible with UPnP (S354). When the router is compatible with UPnP, the country information acquisition unit 272 acquires an address of the router on WAN side by use of UPnP (S358). Further, based on the acquired address of the router, the country information acquisition unit 272 acquires country information indicating a country where the router is located by referring to NIC on the Web (S362).

On the other hand, when the router is not compatible with UPnP, the country information acquisition unit 272 executes traceroute command for the address on the Internet (S366). When using the traceroute command "renoir% traceroute nws1170 traceroute to nws1170.xxxx.co.jp (133.99.128.170), 30 hops max, 40 byte packets", for example, the following response is obtained.

1 karel1 (133.99.10.1) 0.748 ms 0.687 ms 0.679 ms
2 cisc194 (133.99.194.250) 1.321 ms 1.303 ms 1.283 ms
3 cisckan (133.99.144.254) 1.869 ms 1.772 ms 1.751 ms
4 nws1170 (133.99.128.170) 2.394 ms*2.167 ms Receiving such a response result, the country information acquisition unit 272 extracts the next address of the wireless communication device 20 in the response result (S370). Then, when the extracted address is a private address (S374), the country information acquisition unit 272 proceeds to processing in S362. When, on the other hand, the extracted address is not a private address, the country information acquisition unit 272 further extracts the subsequent address and then proceeds to processing in S374 (S378).

Note that, when the router is a gateway device compatible with UPnP, a global address can be acquired using GetExternalIPAddress command.

(Acquisition Method Using Information of Base Station for Wireless LAN)

The country information acquisition unit 272 may acquire country information based on a MAC address (identification information) received from the base station 10 for wireless LAN. For example, the country information acquisition unit 272 may make access to a Web server that stores the MAC address of the base station 10 and position information in association with each other and thereby acquire country information of the base station 10 as country information indicating a country where the wireless communication device 20 is located.

(Acquisition Method Based on Initial Settings)

There may be a case where country information of the wireless communication device 20 is input at initialization by a user of the wireless communication device 20 and stored in the storage unit 280. In such a case, the country information acquisition unit 272 may acquire the country information set by the user from the storage unit 280.

[2-2. Country Determination Method]

Various methods of acquiring country information by the country information acquisition unit 272 are described above. Next, a method that the determination unit 274 determines a country where the wireless communication device 20 is located based on the country information acquired by each acquisition method by the country information acquisition unit 272 is described with reference to FIGS. 10 to 13.

First Example

Figure 10:
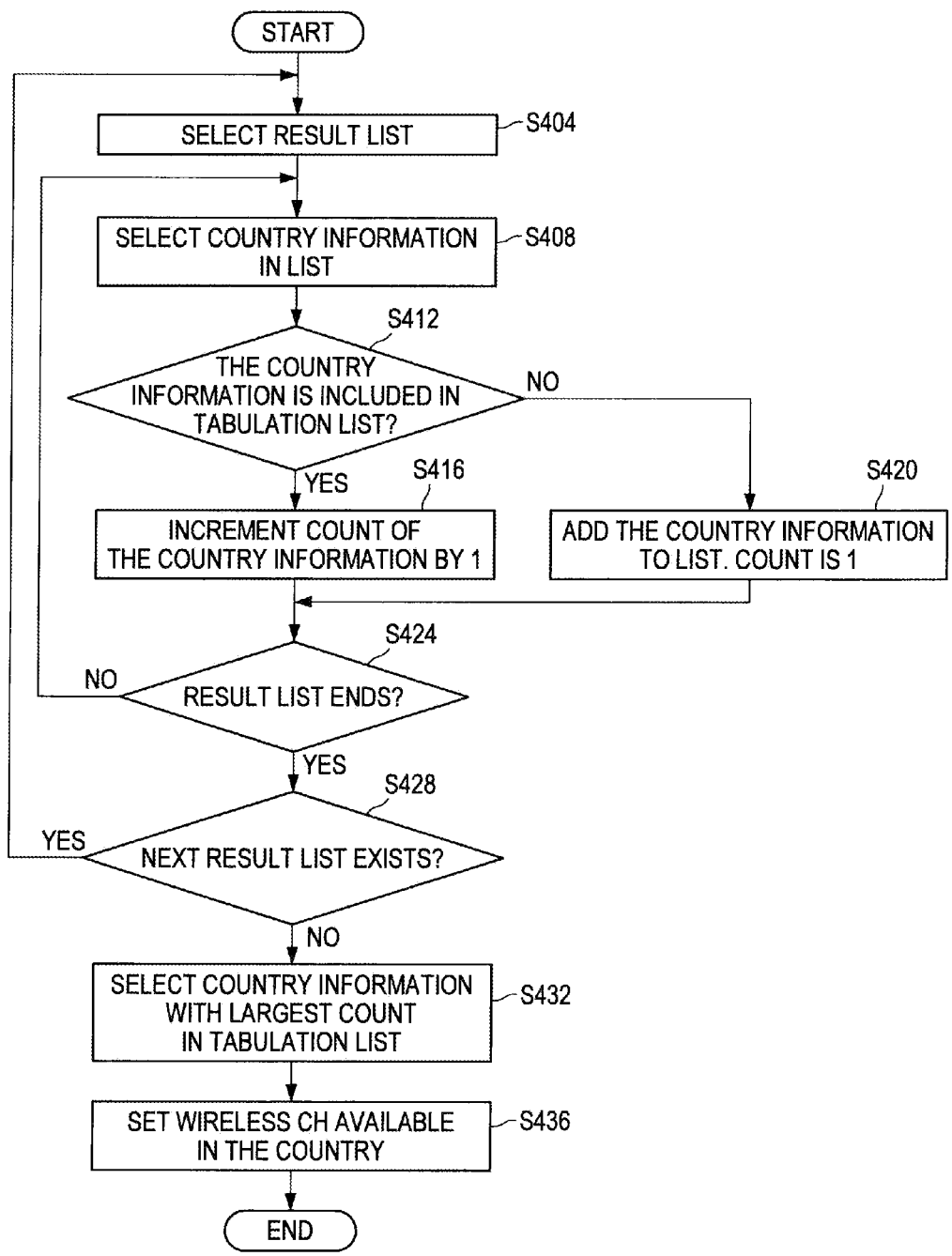
FIG. 10 is a flowchart showing a first example of a country determination method by a determination unit.

FIG. 10 is a flowchart showing a first example of a country determination method by the determination unit 274. Referring to FIG. 10, the determination unit 274 first selects one result list from the result lists obtained by the respective methods by the country information acquisition unit 272 (S404). Note that the result list is a list that includes the country information which is acquired by a certain country information acquisition method by the country information acquisition unit 272.

Then, the determination unit 274 selects country information included in the result list (S408) and determines whether the selected country information is included in a tabulation list or not (S412). When the selected country information is included in the tabulation list, the determination unit 274 increments the count of the country information in the tabulation list by one (S416). On the other hand, when the selected country information is not included in the tabulation list, the determination unit 274 adds the country information to the tabulation list (S420). Note that the tabulation list is a list which is created by summarizing the contents of a plurality of result lists. Specifically, the tabulation list includes country information and count information indicating the number of acquisition methods by which the country information is acquired.

The determination unit 274 repeats the processing from S408 to S420 until all of the country information included in the result list selected in S404 are processed (S424). Further, the determination unit 274 repeats the processing from S404 to S424 until all of the result lists obtained by the country information acquisition unit 272 are processed (S428).

Then, when processing of all the result lists ends, the determination unit 274 selects country information with the largest count in the tabulation list (S432). Specifically, the determination unit 274 determines that the country information with the largest count in the tabulation list is country information indicating a country where the wireless communication device 20 is located. After that, the setting unit 276 sets a frequency (wireless CH) which is available in the country determined by the determination unit 274 to the wireless communication unit 250 (S436).

As described above, according to the first example, the country information which is acquired by the largest number of methods among the country information acquired by a plurality of methods can be determined as country information indicating a country where the wireless communication device 20 is located. It is thus possible to improve the accuracy of determining country information compared with the case of acquiring country information by a single method.

Second Example

Figure 11:
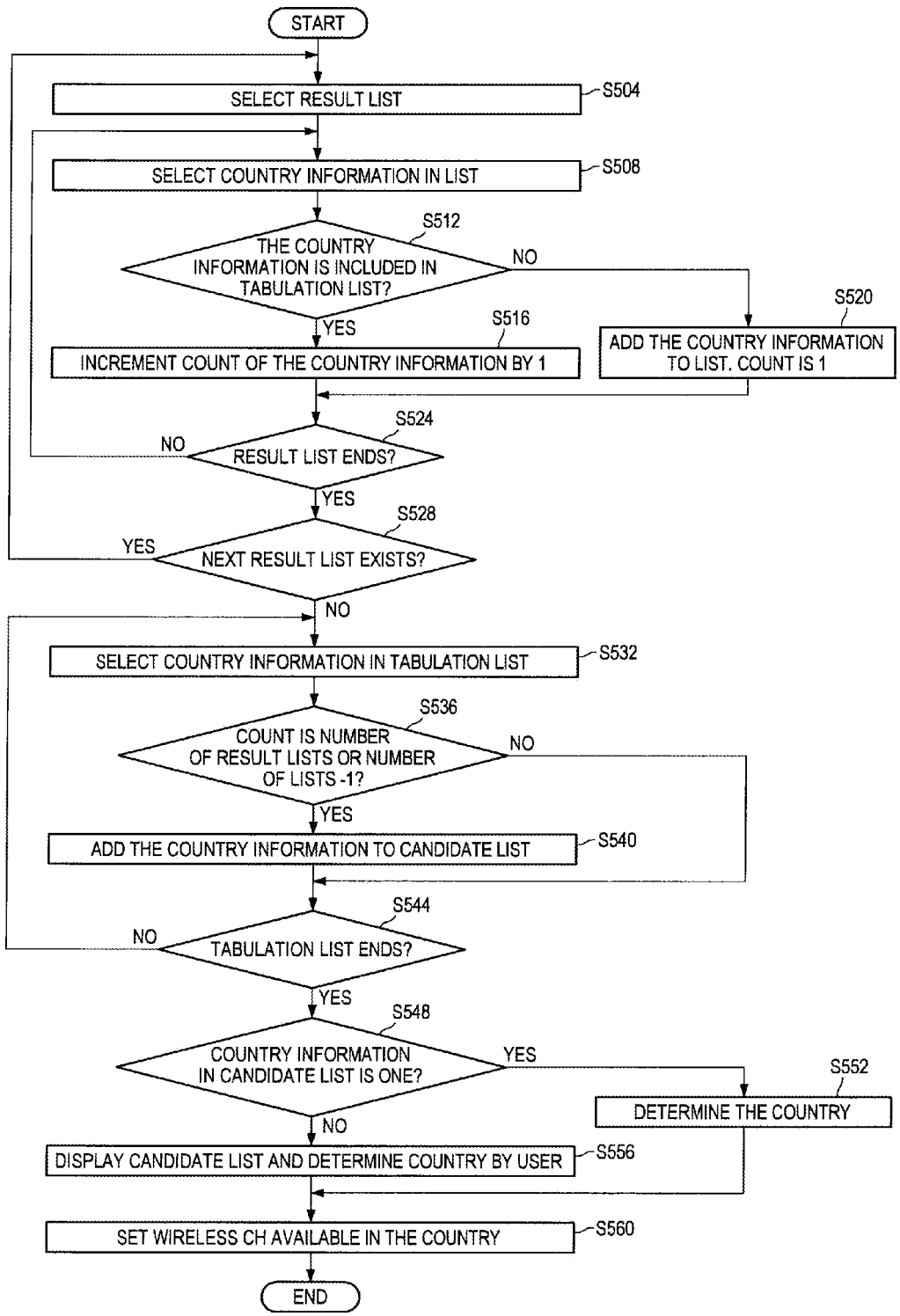
FIG. 11 is a flowchart showing a second example of a country determination method by a determination unit.

FIG. 11 is a flowchart showing a second example of a country determination method by the determination unit 274. Referring to FIG. 11, the determination unit 274 first selects one result list from the result lists obtained by the respective methods by the country information acquisition unit 272 (S504).

Then, the determination unit 274 selects country information included in the result list (S508) and determines whether the selected country information is included in a tabulation list or not (S512). When the selected country information is included in the tabulation list, the determination unit 274 increments the count of the country information in the tabulation list by one (S516). On the other hand, when the selected country information is not included in the tabulation list, the determination unit 274 adds the country information to the tabulation list (S520).

The determination unit 274 repeats the processing from S508 to S520 until all of the country information included in the result list selected in S504 are processed (S524). Further, the determination unit 274 repeats the processing from S504 to S524 until all of the result lists obtained by the country information acquisition unit 272 are processed (S528).

Then, when processing of all the result lists ends, the determination unit 274 selects country information included in the tabulation list (S532). Further, when the count of the selected country information corresponds to the number of result lists or one smaller than the number of result lists (S536), the determination unit 274 adds the country information to a candidate list (S540). The determination unit 274 repeats the processing from S532 to S540 until all of the country information included in the tabulation list are processed (S544).

After that, when processing of all the country information included in the tabulation list ends, the determination unit 274 determines whether country information included in the candidate list is one or not (S548). When country information included in the candidate list is one, the determination unit 274 determines that the country information is country information indicating a country where the wireless communication device 20 is located (S552). On the other hand, when a plurality of pieces of country information are included in the candidate list, the determination unit 274 displays the candidate list on the display unit 230 and determines a country selected by a user as a country where the wireless communication device 20 is located (S556). After that, the setting unit 276 sets a frequency (wireless CH) which is available in the country determined by the determination unit 274 to the wireless communication unit 250 (S560).

As described above, according to the second example, in the case where it is difficult to automatically determine a country where the wireless communication device 20 is located, secure operation of a frequency can be achieved by prompting a user to select a country.

Third Example

Figure 12:
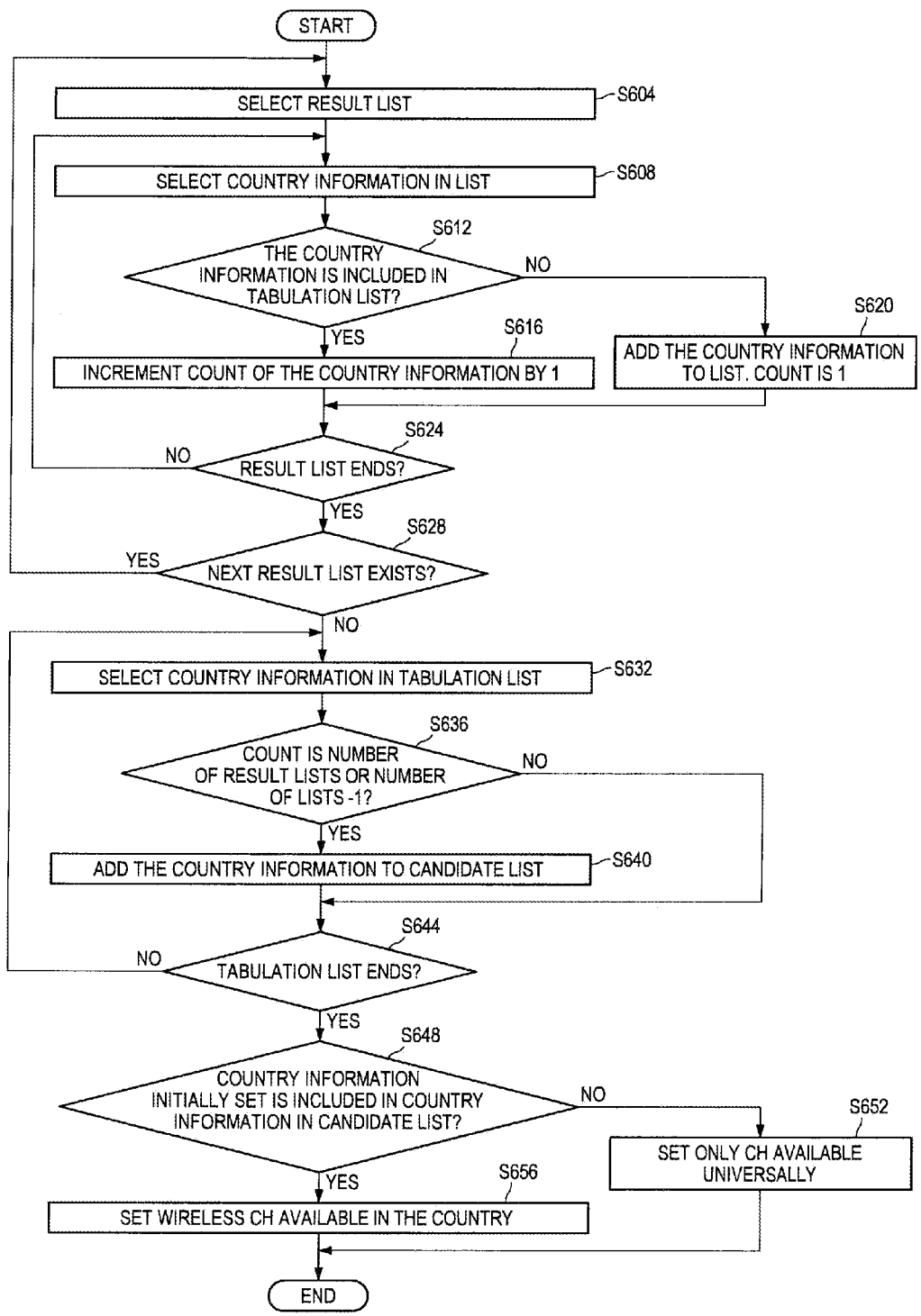
FIG. 12 is a flowchart showing a third example of a country determination method by a determination unit.

FIG. 12 is a flowchart showing a third example of a country determination method by the determination unit 274. Referring to FIG. 12, the determination unit 274 first selects one result list from the result lists obtained by the respective methods by the country information acquisition unit 272 (S604).

Then, the determination unit 274 selects country information included in the result list (S608) and determines whether the selected country information is included in a tabulation list or not (S612). When the selected country information is included in the tabulation list, the determination unit 274 increments the count of the country information in the tabulation list by one (S616). On the other hand, when the selected country information is not included in the tabulation list, the determination unit 274 adds the country information to the tabulation list (S620).

The determination unit 274 repeats the processing from S608 to S620 until all of the country information included in the result list selected in S604 are processed (S624). Further, the determination unit 274 repeats the processing from S604 to S624 until all of the result lists obtained by the country information acquisition unit 272 are processed (S628).

Then, when processing of all the result lists ends, the determination unit 274 selects country information included in the tabulation list (S632). Further, when the count of the selected country information corresponds to the number of result lists or one smaller than the number of result lists (S636), the determination unit 274 adds the country information to a candidate list (S640). The determination unit 274 repeats the processing from S632 to S640 until all of the country information included in the tabulation list are processed (S644).

After that, when processing of all the country information included in the tabulation list ends, the determination unit 274 determines whether country information initially set by a user is included in the candidate list or not (S648). When country information initially set by a user is included in the candidate list, the determination unit 274 determines that the country information is country information indicating a country where the wireless communication device 20 is located. Then, the setting unit 276 sets a frequency (wireless CH) which is available in the country determined by the determination unit 274 to the wireless communication unit 250 (S656).

On the other hand, when country information initially set by a user is not included in the candidate list, the setting unit 276 sets only a frequency which is available universally to the wireless communication unit 250 (S652).

As described above, according to the third example, in the case where the reliability of any country information is doubtful, such as when country information initially set by a user is not included in the candidate list, a frequency available universally can be set.

Fourth Example

Figure 13:
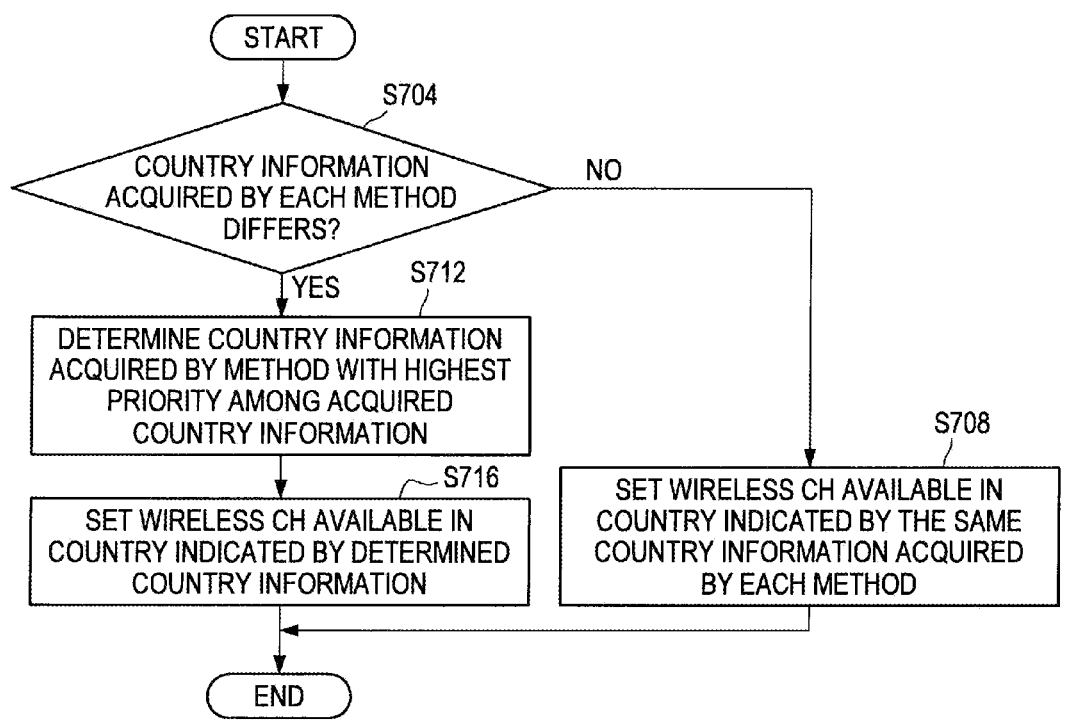
FIG. 13 is a flowchart showing a fourth example of a country determination method by a determination unit.

FIG. 13 is a flowchart showing a fourth example of a country determination method by the determination unit 274. Referring to FIG. 13, the determination unit 274 first determines whether country information acquired by the respective methods by the country information acquisition unit 272 is different from each other or not (S704). When country information acquired by the respective methods is the same, the determination unit 274 determines that the country information is country information indicating a country where the wireless communication device 20 is located. Then, the setting unit 276 sets a frequency (wireless CH) which is available in the country determined by the determination unit 274 to the wireless communication unit 250 (S708).

On the other hand, when country information acquired by the respective methods is different, the determination unit 274 determines country information acquired by the method with the highest priority (S712). The priorities of the respective methods are assigned in advance. For example, the priority of the acquisition method using GPS may be the highest, the priority of the acquisition method using an IP address of a router may be the second highest, and the priority of the acquisition method using a broadcast wave may be the third highest. Note that the priority of the acquisition method using a broadcast wave is relatively low because a case may occur where the wireless communication device 20 receives a broadcast wave of an adjacent country. Then, the setting unit 276 sets a frequency (wireless CH) which is available in the country determined by the determination unit 274 to the wireless communication unit 250 (S716).

As described above, according to the fourth example, a country where the wireless communication device 20 is located can be determined reasonably according to the priority of the country information acquisition method. For example, because the reliability of the acquisition method using GPS is high, when country information can be acquired by GPS, the highest priority can be given to the country information, and when country information is not acquired by GPS, the country information acquired by the method with the second priority can be used.

<3. Summary>

As described in the foregoing, the wireless communication device 20 according to the embodiment of the present disclosure can acquire country information of the wireless communication device 20 by a plurality of different methods. Further, because the wireless communication device determines a country where the wireless communication device 20 is located based on the country information acquired by a plurality of methods, it is possible to improve the accuracy of determining the location country.

Although preferred embodiments of the present disclosure are described in detail above with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

Further, it is not always necessary to perform the steps in the processing of the wireless communication device of the specification in chronological order according to the sequence shown in the flowcharts. For example, the steps in the processing of the wireless communication device 20 may be processed in a difference sequence from the sequence shown in the flowcharts or may be processed in parallel.

Furthermore, it is possible to create a computer program that causes hardware such as a CPU, ROM and RAM incorporated in the wireless communication device 20 to perform the equal functions to the elements of the wireless communication device 20 described above. Further, a storage medium that stores such a computer program may be provided.

What is claimed is:

1. A wireless communication device comprising:
   a determination unit that determines a location region of the wireless communication device;

a communication unit that wirelessly communicates with another wireless communication device; and a setting unit that sets a frequency in accordance with the location region of the wireless communication device determined by the determination unit to the communication unit, wherein the determination unit determines the location region of the wireless communication device based on a plurality of pieces of location region information of the wireless communication device acquired by a plurality of different methods, wherein the plurality of different methods include a first method using GPS to acquire the location region information, a second method that makes access to a network and acquires the location region information from a global address allocated to a router, and a third method that acquires the location region information from broadcast station information contained in a received broadcast wave, and wherein the determination unit processes the location information acquired by each method of the plurality of different methods in accordance with a predetermined processing method such that (i) when a result thereof indicates only one location region the determination unit determines that the one location region is the location region of the wireless communication device, and (ii) when the result indicates a plurality of location regions the determination unit causes the plurality of location regions to be provided to a user to enable the user to select the location region of the wireless communication device therefrom.

2. The wireless communication device according to claim 1, wherein the plurality of methods include a method that acquires the location region information registered in advance in a storage medium.

3. A non-transitory computer readable storage medium having stored thereon a program causing a computer to function as a wireless communication device, the wireless communication device comprising:

a determination unit that determines a location region of the wireless communication device;

a communication unit that wirelessly communicates with another wireless communication device; and a setting unit that sets a frequency in accordance with the location region of the wireless communication device determined by the determination unit to the communication unit, wherein the determination unit determines the location region of the wireless communication device based on a plurality of pieces of location region information of the wireless communication device acquired by a plurality of different methods, wherein the plurality of different methods include a first method using GPS to acquire the location region information, a second method that makes access to a network and acquires the location region information from a global address allocated to a router, and a third method that acquires the location region information from broadcast station information contained in a received broadcast wave, and wherein the determination unit processes the location information acquired by each method of the plurality of different methods in accordance with a predetermined processing method such that (i) when a result thereof indicates only one location region the determination unit determines that the one location region is the location region of the wireless communication device, and (ii) when the result indicates a plurality of location regions the determination unit causes the plurality of location regions to be provided to a user to enable the user to select the location region of the wireless communication device.

4. A wireless communication method comprising steps of:

determining a location region of a wireless communication device; and wirelessly communicating with another wireless communication device by use of a frequency in accordance with the determined location region of the wireless communication device;

wherein the determination of the location region is made based on a plurality of pieces of location region information of the wireless communication device acquired by a plurality of different methods, wherein the plurality of different methods include a first method using GPS to acquire the location region information, a second method that makes access to a network and acquires the location region information from a global address allocated to a router, and a third method that acquires the location region information from broadcast station information contained in a received broadcast wave, and wherein the determination unit processes the location information acquired by each method of the plurality of different methods in accordance with a predetermined processing method such that (i) when a result thereof indicates only one location region the determination unit determines that the one location region is the location region of the wireless communication device, and (ii) when the result indicates a plurality of location regions the determination unit causes the plurality of location regions to be provided to a user to enable the user to select the location region of the wireless communication device therefrom.

5. The wireless communication device according to claim 1, wherein the location region indicates a country.

6. The non-transitory computer readable storage medium according to claim 3, wherein the location region indicates a country.

7. The wireless communication method according to claim 4, wherein the location region indicates a country.

8. The wireless communication device according to claim 1, wherein the predetermined frequency band is a 5 GHz band.

9. The non-transitory computer readable storage medium according to claim 3, wherein the predetermined frequency band is a 5 GHz band.

10. The wireless communication method according to claim 4, wherein the predetermined frequency band is a 5 GHz band.

11. The wireless communication device according to claim 1, wherein the predetermined processing method includes (i) forming a result list for each method of the plurality of different methods representative of the respective location region or regions obtained therefrom, (ii) determining, for each formed result list, whether each location region included therein is included in a tabulation list, and when a determination result thereof indicates that a location region is included increment a count for the location region by one, and when the determination result thereof indicates that the location region is not included add the location region to the tabulation list, (iii) determining for each location region in the tabulation list whether the count associated therewith is equal to a number of results lists or one smaller than the number of results lists and when a result thereof indicates that the count of a respective location region is equal to or one smaller than the number of results lists the respective location region is added to a candidate list, and (iv) determining whether a number of location regions in the candidate list is one or not, and when a result thereof indicates that the number of location regions in the candidate list is only one then the one location region is determined to be the location region of the wireless communication device, and when the result thereof indicates a plurality of location regions then the plurality of location regions are provided to the user to enable the user to select the location region of the wireless communication device therefrom.

12. The non-transitory computer readable storage medium according to claim 3, wherein the predetermined processing method includes (i) forming a result list for each method of the plurality of different methods representative of the respective location region or regions obtained therefrom, (ii) determining, for each formed result list, whether each location region included therein is included in a tabulation list, and when a determination result thereof indicates that a location region is included increment a count for the location region by one, and when the determination result thereof indicates that the location region is not included add the location region to the tabulation list, (iii) determining for each location region in the tabulation list whether the count associated therewith is equal to a number of results lists or one smaller than the number of results lists and when a result thereof indicates that the count of a respective location region is equal to or one smaller than the number of results lists the respective location region is added to a candidate list, and (iv) determining whether a number of location regions in the candidate list is one or not, and when a result thereof indicates that the number of location regions in the candidate list is only one then the one location region is determined to be the location region of the wireless communication device, and when the result thereof indicates a plurality of location regions then the plurality of location regions are provided to the user to enable the user to select the location region of the wireless communication device therefrom.

13. The wireless communication method according to claim 4, wherein the predetermined processing method includes (i) forming a result list for each method of the plurality of different methods representative of the respective location region or regions obtained therefrom, (ii) determining, for each formed result list, whether each location region included therein is included in a tabulation list, and when a determination result thereof indicates that a location region is included increment a count for the location region by one, and when the determination result thereof indicates that the location region is not included add the location region to the tabulation list, (iii) determining for each location region in the tabulation list whether the count associated therewith is equal to a number of results lists or one smaller than the number of results lists and when a result thereof indicates that the count of a respective location region is equal to or one smaller than the number of results lists the respective location region is added to a candidate list, and (iv) determining whether a number of location regions in the candidate list is one or not, and when a result thereof indicates that the number of location regions in the candidate list is only one then the one location region is determined to be the location region of the wireless communication device, and when the result thereof indicates a plurality of location regions then the plurality of location regions are provided to the user to enable the user to select the location region of the wireless communication device therefrom.

* * * * *